United States Patent
Desai et al.

(10) Patent No.: US 12,008,777 B2
(45) Date of Patent: Jun. 11, 2024

(54) VALIDATING AN SFM MAP USING LIDAR POINT CLOUDS

(71) Applicant: ARGO AI, LLC, Pittsburgh, PA (US)

(72) Inventors: Kunal Anil Desai, San Francisco, CA (US); Xxx Xinjilefu, Pittsburgh, PA (US); Gang Pan, Fremont, CA (US); Manu Sethi, Palo Alto, CA (US); Tao V. Fu, Pittsburgh, PA (US)

(73) Assignee: ARGO AI, LLC, Pittsburgh, PA (US)

( * ) Notice: Subject to any disclaimer, the term of this patent is extended or adjusted under 35 U.S.C. 154(b) by 427 days.

(21) Appl. No.: 17/508,681

(22) Filed: Oct. 22, 2021

(65) Prior Publication Data
US 2023/0128756 A1    Apr. 27, 2023

(51) Int. Cl.
*G06T 7/579*    (2017.01)
*G01S 17/894*   (2020.01)
*G01S 17/931*   (2020.01)

(52) U.S. Cl.
CPC ............ *G06T 7/579* (2017.01); *G01S 17/894* (2020.01); *G01S 17/931* (2020.01); *G06T 2207/10028* (2013.01)

(58) Field of Classification Search
CPC .......... G06T 7/579; G06T 2207/10028; G01S 17/894; G01S 17/931
See application file for complete search history.

(56) References Cited

U.S. PATENT DOCUMENTS

| | | | |
|---|---|---|---|
| 8,988,317 B1* | 3/2015 | Liang | H04N 13/232 345/32 |
| 10,338,223 B1 | 7/2019 | Englard et al. | |
| 10,341,633 B2* | 7/2019 | Lindner | G06T 7/593 |
| 10,401,866 B2 | 9/2019 | Rust | |
| 11,645,784 B1* | 5/2023 | Xu | G06N 3/0495 345/420 |

(Continued)

OTHER PUBLICATIONS

Zwicker, Matthias, et al. "Surface splatting." Proceedings of the 28th annual conference on Computer graphics and interactive techniques. 2001. (Year: 2001).*

(Continued)

*Primary Examiner* — Utpal D Shah
(74) *Attorney, Agent, or Firm* — Sterne, Kessler, Goldstein & Fox P.L.L.C.

(57) ABSTRACT

Disclosed herein are system and method embodiments to implement a validation of an SfM map. An embodiment operates by receiving a motion-generated map corresponding to a digital image, generating a first depth map, wherein the first depth map comprises depth information for one or more triangulated points located within the motion generated image. The embodiment further receives a light detection and ranging (lidar) generated point cloud including at least a portion of the one or more triangulated points, splats the lidar point cloud proximate to the portion of the one or more triangulated points and generates a second depth map for the portion and identifies an incorrect triangulated point, of the one or more triangulated points, based on comparing the first depth information to the second depth information. The incorrect triangulated points may be removed from the SfM map or marked with a low degree of confidence.

20 Claims, 11 Drawing Sheets

(56) References Cited

U.S. PATENT DOCUMENTS

| | | | |
|---|---|---|---|
| 2017/0148168 A1* | 5/2017 | Lindner | H04N 13/128 |
| 2018/0341019 A1 | 11/2018 | Sakai et al. | |
| 2019/0061771 A1 | 2/2019 | Bier et al. | |
| 2020/0066025 A1* | 2/2020 | Peebler | G06V 20/20 |
| 2020/0182969 A1 | 6/2020 | He et al. | |
| 2020/0402246 A1 | 12/2020 | Hekmatian et al. | |
| 2021/0011161 A1 | 1/2021 | Chen et al. | |
| 2021/0033706 A1 | 2/2021 | Funaya | |
| 2021/0065391 A1* | 3/2021 | Tran | G06T 7/246 |
| 2021/0279444 A1* | 9/2021 | Lindner | G01S 7/4972 |
| 2021/0295599 A1 | 9/2021 | Adkinson et al. | |
| 2021/0319236 A1 | 10/2021 | Tang et al. | |
| 2023/0027234 A1* | 1/2023 | Wu | G06T 7/194 |
| 2023/0351624 A1* | 11/2023 | Ruhkamp | G06T 7/529 |

OTHER PUBLICATIONS

International Search Report and Written Opinion of the International Searching Authority directed to related International Patent Application No. PCT/US2022/078556, mailed Jan. 30, 2023; 10 pages.

Kennedy, W., "Control Electronics for a Multi-Laser/Multi-Detector Scanning System", RPI Technical Report MP-73, School of Engineering, Rensselaer Polytechnic Institute, Troy, NY, Aug. 1980, 114 pages.

Craig, J. et al., "Elevation Scanning LASER/Multi-Sensor Hazard Detection System Controller and Mirror/Mast Speed Control Components", RPI Technical Report MP-59, School of Engineering, Rensselaer Polytechnic Institute, Troy, NY, Aug. 1978, 135 pages.

\* cited by examiner

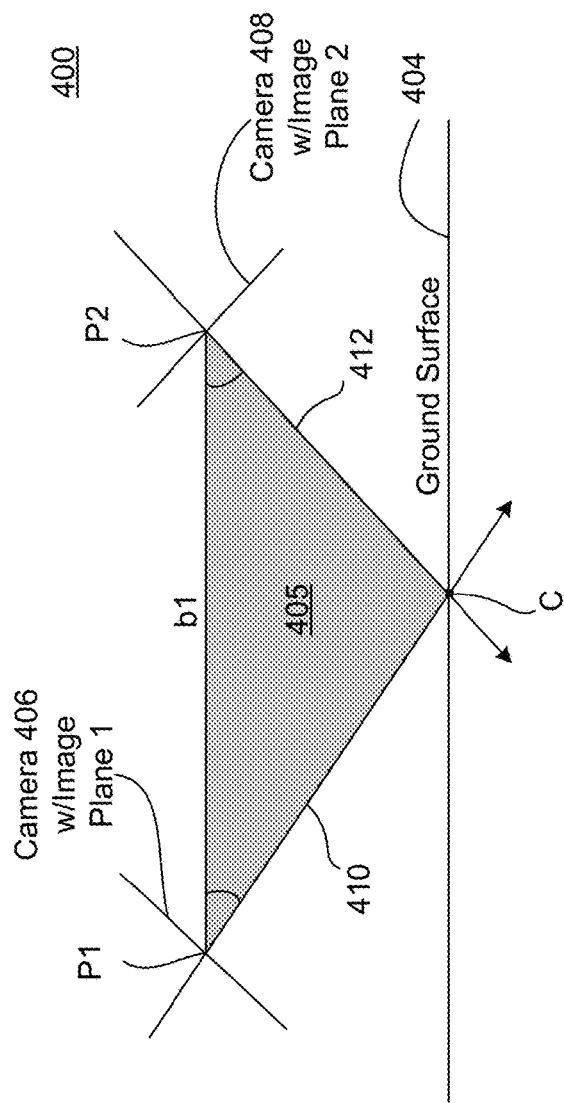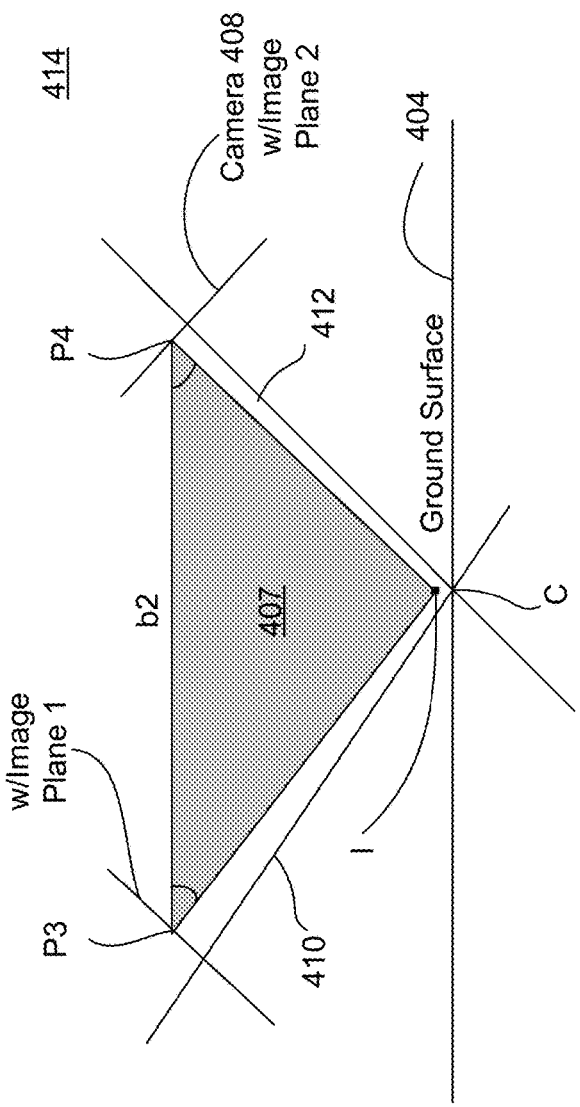
FIG. 4A
FIG. 4B

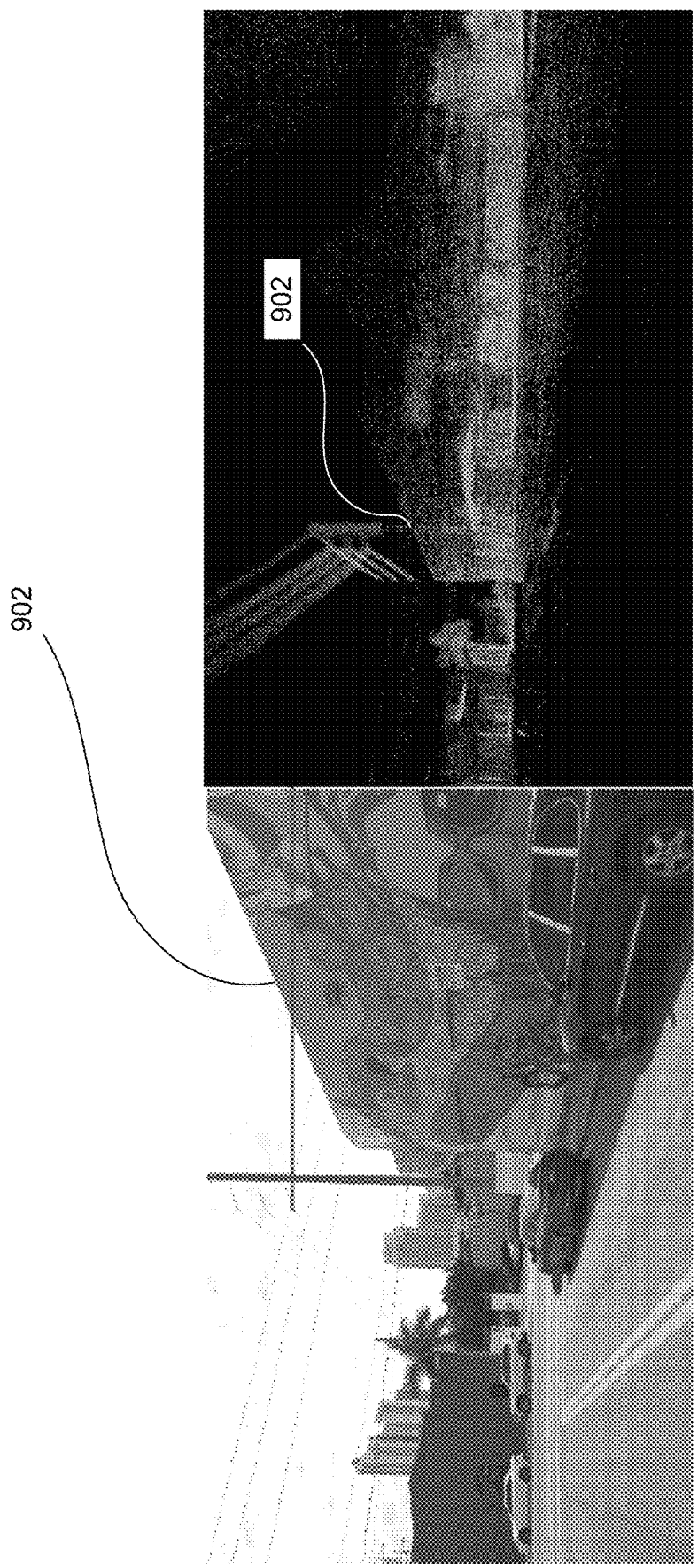

VALIDATING AN SFM MAP USING LIDAR POINT CLOUDS

BACKGROUND

Structure from motion (SfM) is a photogrammetric range imaging technique for estimating three-dimensional structures from two-dimensional image sequences that may be coupled with local motion signals. However, three-dimensional (3D) maps generated using SfM point clouds may suffer from outlier 3D points which arise because of incorrect key points resulting in incorrect triangulations. Incorrect key points may be caused by calibration errors, parallax errors as well as errors associated with moving objects, etc. Some solutions may attempt to match two point clouds. However, lacking is a comprehensive solution to validate an SfM map to identify these incorrect key points.

BRIEF DESCRIPTION OF THE DRAWINGS

The accompanying drawings are incorporated herein and form a part of the specification.

FIG. 4A illustrates a correct ground surface triangulation, according to some embodiments.

FIG. 4B illustrates an incorrect ground surface triangulation, according to some embodiments.

FIG. 9A illustrates an image of a vehicle environment, according to some embodiments.

FIG. 9B illustrates a lidar point cloud of the vehicle environment with potential outlier key points, according to some embodiments.

In the drawings, like reference numbers generally indicate identical or similar elements. Additionally, generally, the left-most digit(s) of a reference number identifies the drawing in which the reference number first appears.

DETAILED DESCRIPTION

Figure 1:
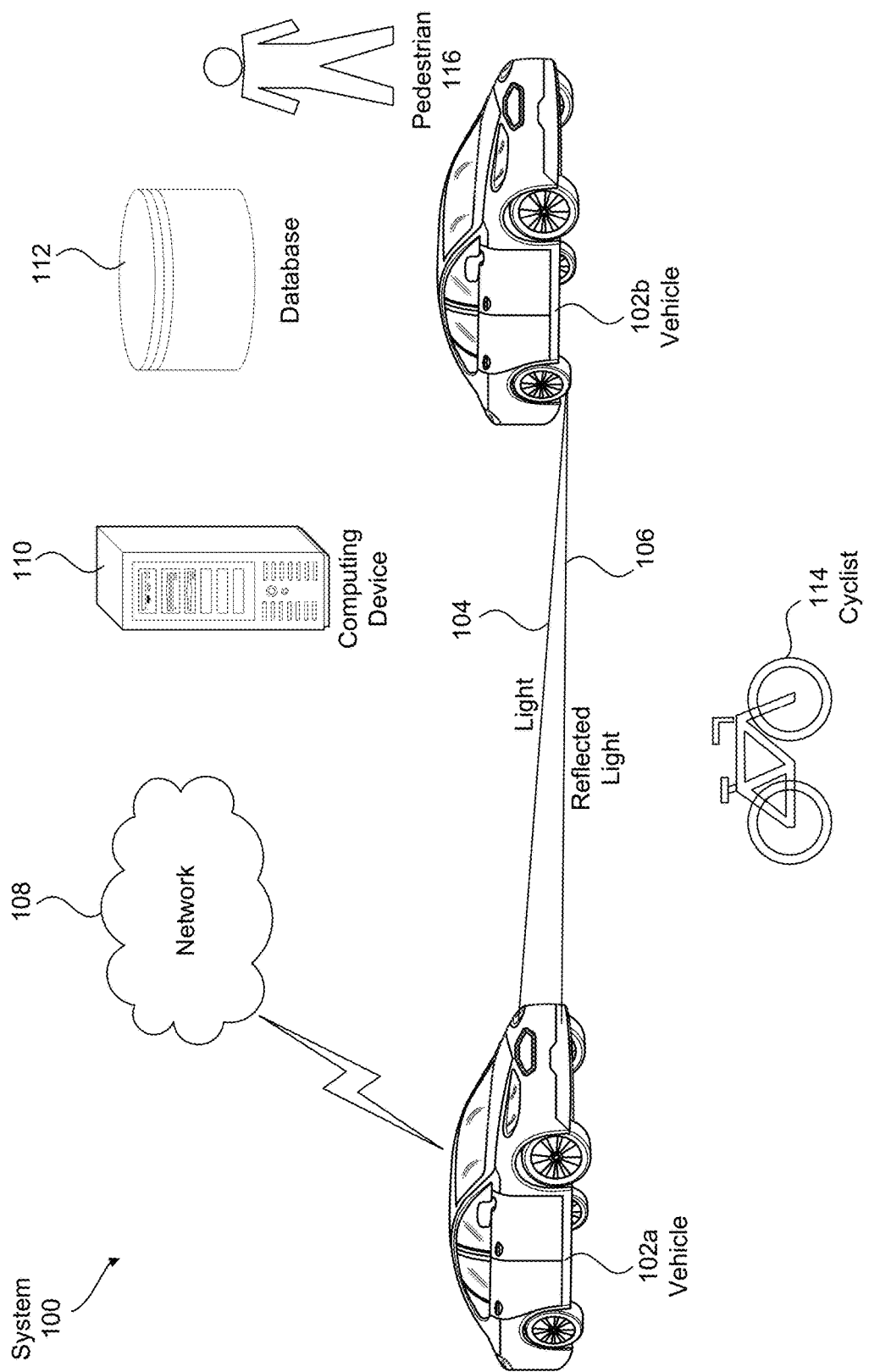
FIG. 1 illustrates an exemplary autonomous vehicle system, in accordance with aspects of the disclosure.

Provided herein are system, apparatus, device, method and/or computer program product embodiments, and/or combinations and sub-combinations thereof, for validating an SfM map using light detection and ranging (lidar) point clouds. SfM is a photogrammetric range imaging technique for estimating three-dimensional structures from two-dimensional image sequences that may be coupled with local motion signals. Lidar uses a pulsed laser to measure distances to, but not limited to, buildings, pedestrians, signs or other objects. It may use ultraviolet, visible, or a near-infrared source to sense objects. Light energy emitted by a lidar system is known as a pulse or transmitted waveform and light reflected from the object is known as return or reflected waveform.

Creating SfM maps may require finding correspondence between multiple images. Features, such as corner points or edges, are tracked from one image to the next. Another type of feature to track between multiple images may include curves (e.g., locally an edge with gradients in one direction) and is known as pointless SfM (e.g., common in man-made environments). The features detected from all the images will then be matched (e.g., overlaid). However, there are instances where some of the matched features are incorrectly matched due to potential outlier key points.

A faulty or incorrectly trained key point detector could potentially result in a number of low quality key points in the images used for creating a 3D map using SfM. As such, key points may get arbitrarily associated with other similar points (because they have a similar descriptor) when matched across different images. These incorrect matches may erroneously pass a geometric verification test because they may end up lying on a same epipolar line. The triangulation that results from such erroneous matches results in a 3D point that does not exist in reality. In one non-limiting example, such incorrectly triangulated points may end up lying either above the ground or below the ground. In another non-limiting example, a number of points may be projected in a center of an SfM map where no structures are actually present. These points are additional examples of incorrectly triangulated points which lie above the ground surface as will be described in greater detail in FIGS. 4A and 4B.

In some embodiments, the technology described herein circumvents problems validating an SfM map using localization prior. Localization prior is a map created from lidar point clouds that may be restricted to a particular place or location. Localization prior may not suffer from triangulation or correspondence issues, and also may not have parallax issues. Therefore, a localization prior may be used to identify and discard outlier points in an SfM map. The technology described herein outlines a system configured to consider a localization prior to remove the outliers from an SfM map, and produce a confidence measure over inlier points.

As will be described in FIGS. 1-3, mobile lidar (also mobile laser scanning) is when one or more scanners are attached to a moving vehicle to collect data along a path. These scanners may be paired with other kinds of equipment, including Global Navigation Satellite System (GNSS) receivers and Inertial Measurement Units (IMUs). One example application is mapping streets, where power lines, exact bridge heights, bordering trees, etc. all need to be taken into account. Instead of collecting each of these measurements individually in the field, in some embodiments, a 3-D model from a point cloud may be created where all of the measurements needed can be made, depending on the quality of the data collected. This eliminates the problem of missing a measurement, so long as the model is available, reliable and has an appropriate level of accuracy.

Lidar mapping involves a process of occupancy grid map generation. The process involves an array of cells divided into grids, which employ a process to store the height values when lidar data falls into the respective grid cell. A binary map is then created by applying a particular threshold to the cell values for further processing. The next step is to process the radial distance and z-coordinates from each scan to identify which 3-D points correspond to each of the specified grid cells leading to the process of data formation.

The term "vehicle" refers to any moving form of conveyance that is capable of carrying either one or more human occupants and/or cargo and is powered by any form of energy. The term "vehicle" includes, but is not limited to, cars, trucks, vans, trains, autonomous vehicles, aircraft, aerial drones and the like. An "autonomous vehicle" (or "AV") is a vehicle having a processor, programming instructions and drivetrain components that are controllable by the processor without requiring a human operator. An autonomous vehicle may be fully autonomous in that it does not require a human operator for most or all driving conditions and functions, or it may be semi-autonomous in that a human operator may be required in certain conditions or for certain operations, or that a human operator may override the vehicle's autonomous system and may take control of the vehicle.

Notably, the present solution is being described herein in the context of an autonomous vehicle. However, the present solution is not limited to autonomous vehicle applications. The present solution may be used in other applications such as robotic applications, radar system applications, metric applications, and/or system performance applications.

FIG. 1 illustrates an exemplary autonomous vehicle system 100, in accordance with aspects of the disclosure. System 100 comprises a vehicle 102a that is traveling along a road in a semi-autonomous or autonomous manner. Vehicle 102a is also referred to herein as AV 102a. AV 102a can include, but is not limited to, a land vehicle (as shown in FIG. 1), an aircraft, or a watercraft.

AV 102a is generally configured to detect objects (102b, 114 or 116) in proximity thereto. The objects can include, but are not limited to, a vehicle 102b, cyclist 114 (such as a rider of a bicycle, electric scooter, motorcycle, or the like) and/or a pedestrian 116. When such a detection is made, AV 102a performs operations to generate one or more possible object trajectories for the detected object and analyze at least one of the generated possible object trajectories to determine whether or not there is an undesirable probability that a collision will occur between the AV and object in a threshold period of time (e.g., 1 minute). If so, the AV 102a performs operations to determine whether the collision can be avoided if a given vehicle trajectory is followed by the AV 102a and any one of a plurality of dynamically generated emergency maneuvers is performed in pre-defined time period (e.g., N milliseconds). If the collision can be avoided, then the AV 102a takes no action or optionally performs a cautious maneuver (e.g., mildly slows down). In contrast, if the collision cannot be avoided, then the AV 102a immediately takes an emergency maneuver (e.g., brakes and/or changes direction of travel). Other approaches to collision detection and avoidance by AV 102a are contemplated by this disclosure as would be understood by one skilled in the relevant art.

As will be described in greater detail in association with FIG. 3 and FIG. 4, AV 102a is configured with a lidar system 300. Lidar system 300 may include a light emitter system 304 (transmitter) that transmits a light pulse 104 to detect objects located within a distance or range of distances of AV 102a. Light pulse 104 may be incident on one or more objects (e.g., AV 102b) and be reflected back to lidar system 300. Reflected light pulse 106 incident on light a detector 308 is processed by lidar system 300 to determine a distance of that object to AV 102a. Light detector 308 may, in some embodiments, contain a photodetector or array of photodetectors positioned and configured to receive the light reflected back into the system. Lidar information, such as detected object data, is communicated from lidar system 300 to an on-board computing device 220 (FIG. 2). AV 102a may also communicate lidar data to a remote computing device 110 (e.g., cloud processing system) over communications network 108. Remote computing device 110 may be configured with one or more servers to process one or more processes of the technology described herein. Remote computing device 110 may also be configured to communicate data/instructions to/from AV 102a over network 108, to/from server(s) and/or database(s) 112.

Network 108 may include one or more wired or wireless networks. For example, the network 108 may include a cellular network (e.g., a long-term evolution (LTE) network, a code division multiple access (CDMA) network, a 3G network, a 4G network, a 5G network, another type of next generation network, etc.). The network may also include a public land mobile network (PLMN), a local area network (LAN), a wide area network (WAN), a metropolitan area network (MAN), a telephone network (e.g., the Public Switched Telephone Network (PSTN)), a private network, an ad hoc network, an intranet, the Internet, a fiber optic-based network, a cloud computing network, and/or the like, and/or a combination of these or other types of networks.

AV 102a may retrieve, receive, display, and edit information generated from a local application or delivered via network 108 from database 112. Database 112 may be configured to store and supply raw data, indexed data, structured data, map data, program instructions or other configurations as is known.

Figure 2:
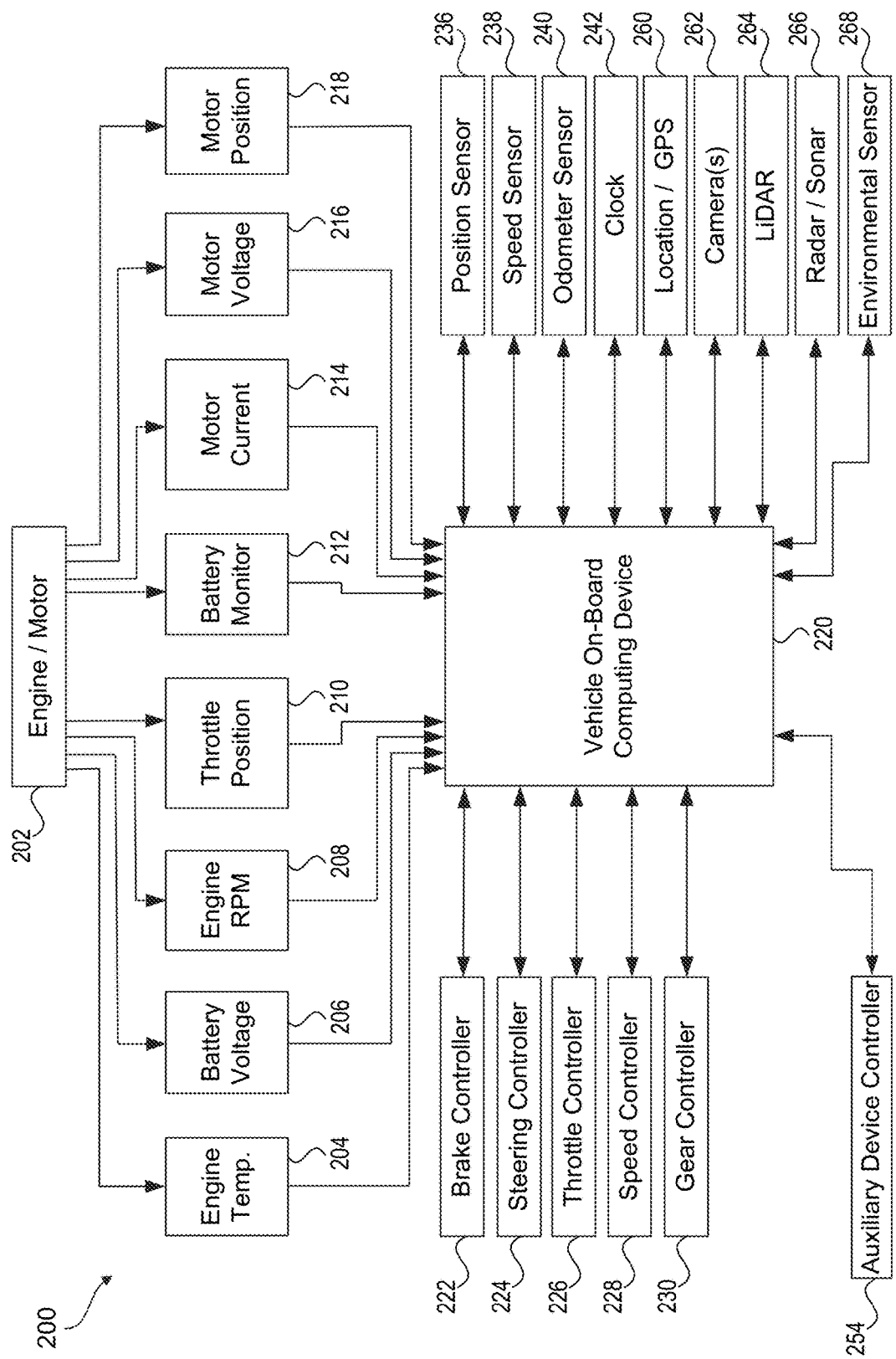
FIG. 2 illustrates an exemplary architecture for a vehicle, in accordance with aspects of the disclosure.

FIG. 2 illustrates an exemplary system architecture 200 for a vehicle, in accordance with aspects of the disclosure. Vehicles 102a and/or 102b of FIG. 1 can have the same or similar system architecture as that shown in FIG. 2. Thus, the following discussion of system architecture 200 is sufficient for understanding vehicle(s) 102a, 102b of FIG. 1. However, other types of vehicles are considered within the scope of the technology described herein and may contain more or less elements as described in association with FIG. 2. As a non-limiting example, an airborne vehicle may exclude brake or gear controllers, but may include an altitude sensor. In another non-limiting example, a water-based vehicle may include a depth sensor. One skilled in the art will appreciate that other propulsion systems, sensors and controllers may be included based on a type of vehicle, as is known.

As shown in FIG. 2, system architecture 200 includes an engine or motor 202 and various sensors 204-218 for measuring various parameters of the vehicle. In gas-powered or hybrid vehicles having a fuel-powered engine, the sensors may include, for example, an engine temperature sensor 204, a batten voltage sensor 206, an engine Rotations Per Minute ("RPM") sensor 208, and a throttle position sensor 210. If the vehicle is an electric or hybrid vehicle, then the vehicle may have an electric motor, and accordingly includes sensors such as a battery monitoring system 212 (to measure current, voltage and/or temperature of the battery), motor current 214 and voltage 216 sensors, and motor position sensors 218, such as resolvers and encoders.

Operational parameter sensors that are common to both types of vehicles include, for example: a position sensor 236 such as an accelerometer, gyroscope and/or inertial measurement unit; a speed sensor 238; and an odometer sensor 240. The vehicle also may have a clock 242 that the system uses to determine vehicle time during operation. The clock 242 may be encoded into the vehicle on-board computing device, it may be a separate device, or multiple clocks may be available.

The vehicle also includes various sensors that operate to gather information about the environment in which the vehicle is traveling. These sensors may include, for example: a location sensor 260 (e.g., a Global Positioning System ("GPS") device); object detection sensors such as one or more cameras 262; a lidar system 264; and/or a radar and/or a sonar system 266. The sensors also may include environmental sensors 268 such as a precipitation sensor and/or ambient temperature sensor. The object detection sensors may enable the vehicle to detect objects that are within a given distance range of the vehicle 200 in any direction, while the environmental sensors collect data about environmental conditions within the vehicle's area of travel.

During operations, information is communicated from the sensors to a vehicle on-board computing device 220. The vehicle on-board computing device 220 analyzes the data captured by the sensors and optionally controls operations of the vehicle based on results of the analysis. For example, the vehicle on-hoard computing device 220 may control: braking via a brake controller 222; direction via a steering controller 224; speed and acceleration via a throttle controller 226 (in a gas-powered vehicle) or a motor speed controller 228 (such as a current level controller in an electric vehicle); a differential gear controller 230 (in vehicles with transmissions); and/or other controllers. Auxiliary device controller 254 may be configured to control one or more auxiliary devices, such as testing systems, auxiliary sensors, mobile devices transported by the vehicle, etc.

Geographic location information may be communicated from the location sensor 260 to the on-board computing device 220, which may then access a map of the environment that corresponds to the location information to determine known fixed features of the environment such as streets, buildings, stop signs and/or stop/go signals. Captured images from the cameras 262 and/or object detection information captured from sensors such as lidar system 264 is communicated from those sensors) to the vehicle on-board computing device 220. The object detection information and/or captured images are processed by the vehicle on-board computing device 220 to detect objects in proximity to the vehicle. Any known or to be known technique for making an object detection based on sensor data and/or captured images can be used in the embodiments disclosed in this document.

Lidar information is communicated from lidar system 264 to the on-board computing device 220. Additionally, captured images are communicated from the camera(s) 262 to the vehicle on-board computing device 220. The lidar information and/or captured images are processed by the vehicle on-board computing device 220 to detect objects in proximity to the vehicle 200. The manner in which the object detections are made by the vehicle on-board computing device 220 includes such capabilities detailed in this disclosure.

When the vehicle on-board computing device 220 detects a moving object, the vehicle on-board computing device 220 generates one or more possible object trajectories for the detected object, and analyze the possible object trajectories to assess the probability of a collision between the object and the AV. If the probability exceeds an acceptable threshold, the vehicle on-board computing device 220 performs operations to determine whether the collision can be avoided if the AV follows a defined vehicle trajectory and/or implements one or more dynamically generated emergency maneuvers is performed in a pre-defined time period (e.g., N milliseconds). If the collision can be avoided, then the vehicle on-board computing device 220 may cause the vehicle to perform a cautious maneuver (e.g., mildly slow down, accelerate, or swerve). In contrast, if the collision cannot be avoided, then the vehicle on-board computing device 220 causes the vehicle to take an emergency maneuver (e.g., brake and/or change direction of travel).

Figure 3:
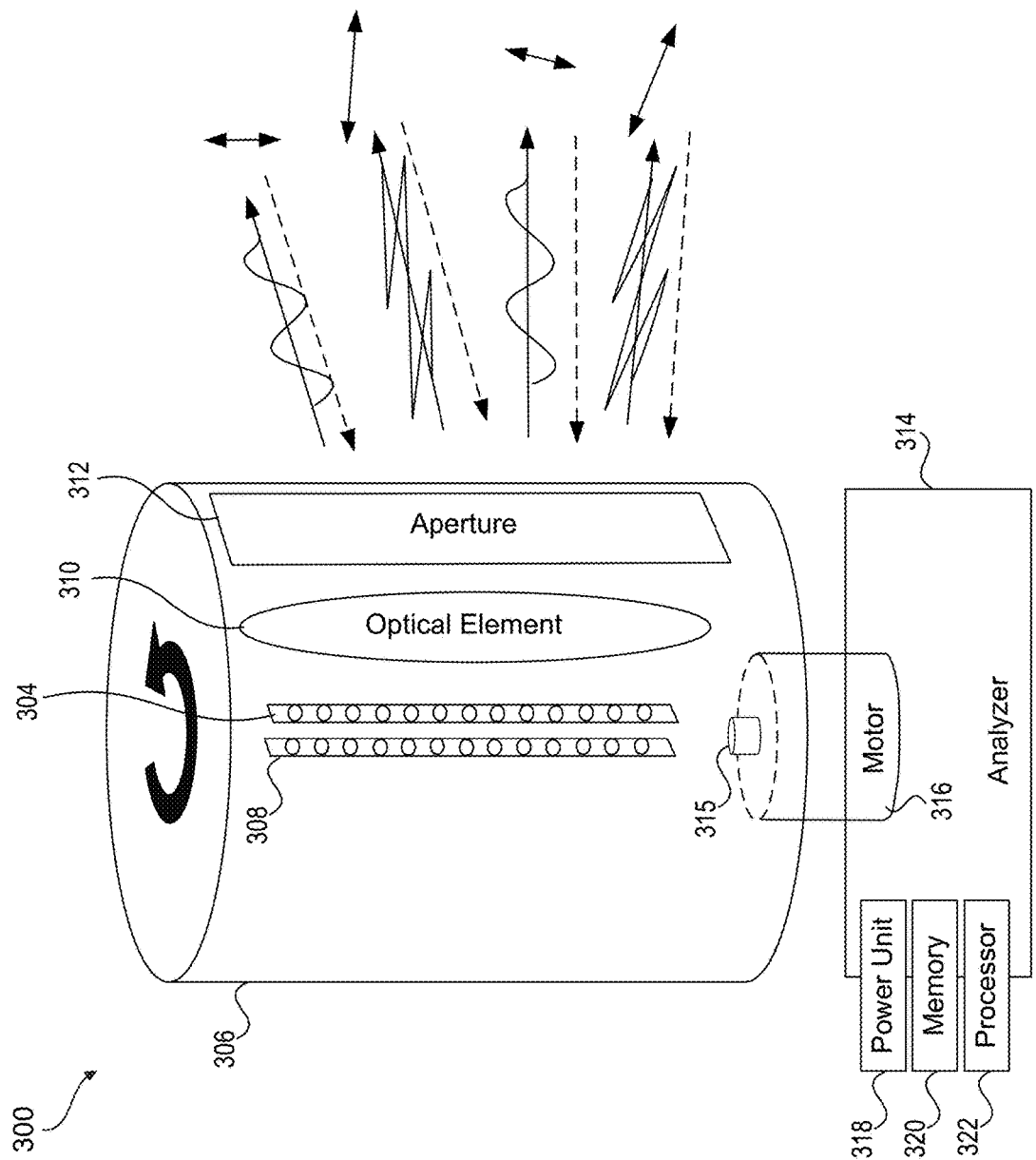
FIG. 3 illustrates an exemplary architecture for a lidar system, in accordance with aspects of the disclosure.

FIG. 3 illustrates an exemplary architecture for a lidar system 300, in accordance with aspects of the disclosure. Lidar system 264 of FIG. 2 may be the same as or substantially similar to the lidar system 300. As such the discussion of lidar system 300 is sufficient for understanding lidar system 264 of FIG. 2.

As shown in FIG. 3, the lidar system 300 includes a housing 306, which may be rotatable 360° about a central axis such as hub or axle 315 of motor 316. The housing may include an emitter/receiver aperture 312 made of a material transparent to light. Although a single aperture is shown in FIG. 2, the present solution is not limited in this regard. In other scenarios, multiple apertures for emitting and/or receiving light may be provided. Either way, the lidar system 300 can emit light through one of more of the aperture(s) 312 and receive reflected light back toward one or more of the aperture(s) 312 as the housing 306 rotates around the internal components. In an alternative scenario, the outer shell of housing 306 may be a stationary dome, at least partially made of a material that is transparent to light, with rotatable components inside of the housing 306.

Inside the rotating shell or stationary dome is a light emitter system 304 that is configured and positioned to generate and emit pulses of light through the aperture 312 or through the transparent dome of the housing 306 via one or more laser emitter chips or other light emitting devices. The light emitter system 304 may include any number of individual emitters (e.g., 8 emitters, 64 emitters, of 128 emitters). The emitters may emit light of substantially the same intensity or of varying intensities. The lidar system also includes a light detector 308 containing a photodetector or array of photodetectors positioned and configured to receive light reflected back into the system. The light emitter system 304 and light detector 308 would rotate with the rotating shell, or they would rotate inside the stationary dome of the housing 306. One or more optical element structures 310 may be positioned in front of the light emitter system 304 and/or the light detector 308 to serve as one or more lenses or waveplates that focus and direct light that is passed through the optical element structure 310.

One or more optical element structures 310 may be positioned in front of a mirror (not shown) to focus and direct light that is passed through the optical element structure 310. As shown below, the system includes an optical element structure 310 positioned in front of the mirror and connected to the rotating elements of the system so that the optical element structure 310 rotates with the mirror. Alternatively or in addition, the optical element structure 310 may include multiple such structures (for example lenses and/or waveplates). Optionally, multiple optical element structures 310 may be arranged in an array on or integral with the shell portion of the housing 306.

Lidar system 300 includes a power unit 318 to power the light emitter system 304, a motor 316, and electronic components. lidar system 300 also includes an analyzer 314 with elements such as a processor 322 and non-transitory computer-readable memory 320 containing programming instructions that are configured to enable the system to receive data collected by the light detector unit, analyze it to measure characteristics of the light received, and generate information that a connected system can use to make decisions about operating in an environment from which the data was collected. Optionally, the analyzer 314 may be integral with the lidar system 300 as shown, or some or all of it may be external to the lidar system and communicatively connected to the lidar system via a wired or wireless communication network or link.

FIGS. 4A and 4B, collectively, illustrate two cameras capturing a point on a ground surface, such as a road. In FIG. 4A the ground surface point is calculated correctly, while FIG. 4B illustrates an incorrect calculation of a ground surface point due to one or more errors in the imagery. As previously discussed, errors in the imagery may be caused by calibration errors, parallax errors, as well as errors associated with moving objects, etc. While shown for two cameras and a single key point triangulation, the technology described herein may consider any number of key points using any number of cameras and any number of images without departing from the scope of the technology described herein.

FIG. 4A illustrates an example SfM map with a correctly mapped key point, according to some embodiments. In trigonometry and geometry, triangulation is the process of determining the location of a point by forming triangles to the point from known points. For purposes of identifying various objects of interest in a visualization mapping (SfM or lidar), many points located within the map may correspond to key points. Example key points of an object located in a viewing space (e.g., of a vehicle) may include, but not be limited to, object corners, edges, surfaces, etc. For illustration purposes only, FIGS. 4A and 4B will be reduced to triangulating a location of a single point. However, the process may be repeated for any number of points in the SfM map. Corresponding depth mapping of these points may assist, for example, an autonomous driving system 100 to understand the environment (e.g., proximate objects) in its immediate path and therefore avoid collisions.

SfM map 400 may include a point C that intersects a ground surface 404. For example, key points may be located on a ground surface, such as a road. In SfM map 400, correct triangulation of this ground surface point C may be essential to establishing a driving path for an autonomous vehicle 102-A.

A spatial triangle 405 may be formed by two cameras 406 and 408 and a point located within their field of view. Within this spatial triangle 405, the distance between the cameras is the base b1 of the triangle and may be known. For example, cameras 406 and 408 may each retain a geospatial location (e.g., using global positioning satellite (GPS)). By determining a distance between center points on their respective image planes (image plane 1 and image plane 2), the base (b1) of the triangle may be determined. The image plane in a camera is a surface the light is focused onto after passing through a photographic lens. For example, in digital cameras the image plane is the surface of the digital image sensor.

Angles between camera centerlines 410 and 412 and the base intersection points P1 and P2 may be calculated from known geometric triangular relationships. In this scenario, a correct key point C on the ground surface will be calculated from a triangle consisting of correspondence points P1 and P2 and the intersection (point C) of their camera centerlines. Correspondence points are a set of points in one image that are the same points in another image. An incorrect correspondence point may occur when an algorithm incorrectly solves for the correspondence point in image B for a point in image A.

FIG. 4B illustrates an example SfM map with an incorrectly mapped key point, according to some embodiments. For illustration purposes only, the figure will be reduced to determining a location of a single point. However, the process may be repeated for any number of points in the SfM map.

SfM map 414 may include an improper triangulation that incorrectly identifies a point I that is not on the ground surface 404, but is actually located just slightly above the ground surface 404. If either, or both, of the correspondence points P1 or P2 (FIG. 4A) are misidentified (location), errors in a subsequent triangulation 407 will result and therefore identify an incorrect key point. For example, a first camera 406, with image plane 1, includes point C in its image capture. A second camera 408, with image plane 2, also captures point C in its image capture. However, in this scenario, an incorrect key point I above the ground surface will be calculated from a triangle 407, with base b2, based on incorrect correspondence points P3 and P4 and the intersection of their projections (point I). Key point I is not considered an accurate position of the key point C and therefore may prevent generation of an accurate SfM map. Incorrect correspondence points may have been generated by algorithmic limitations, poor sensor (image) quality, incorrect image sensor calibration, incorrect extrinsic camera calibration, etc.

The incorrect triangulation example as described in FIG. 4A and FIG. 4B is a non-limiting example. One skilled in the art will appreciate that other approaches may be used or contemplated with the scope of the technology described herein. For example, any incorrectly calculated depth of a point in an SfM map may be corrected using the technology described herein.

Figure 5:
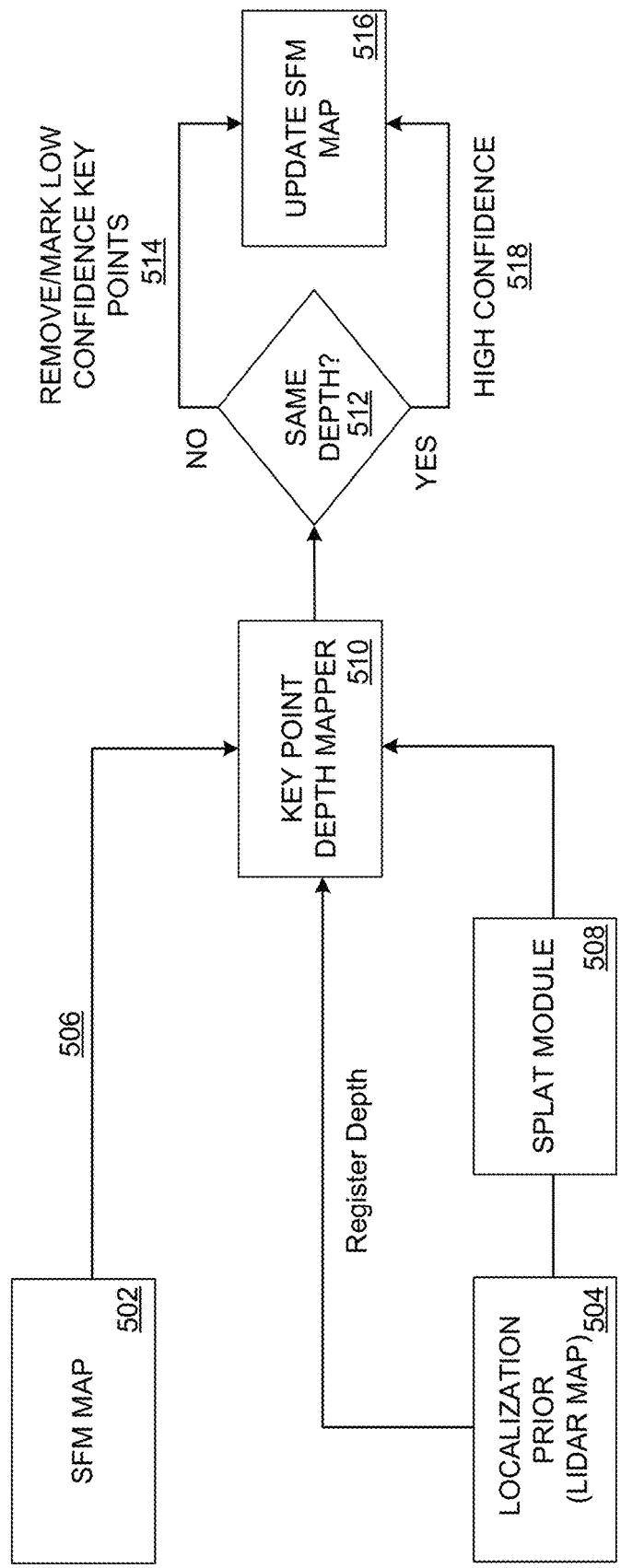
FIG. 5 illustrates a block diagram of SfM map validation, according to some embodiments.

FIG. 5 illustrates an exemplary block diagram 500 of validating an SfM map, according to some embodiments. SfM map 502 may include a plurality of points representing various objects within as field of view. Many of these points may be key points needed to identify objects through their boundaries (e.g., vertices, edges, surfaces, etc.). However, a faulty or incorrectly trained key point detector could potentially result in a number of low quality key points in the images used for creating a 3D map using SfM. For example, uninteresting points, such as points not located on objects (e.g., road surface, buildings, vehicles, pedestrians, signs, etc.), may be incorrectly detected as key points. As such, key points may get arbitrarily associated with other points (because they have a similar descriptor) when matched across different images. As shown in FIG. 4B, a triangulation that results from such erroneous matches results in a 3D key point that may not exist in reality. For example, a number of points may be projected in the center of the image where no structures are actually present (see FIG. 7). An autonomous vehicle 102-A may rely on accurate depth maps to navigate the vehicle. Inaccurately triangulated road surface key points may cause the vehicle to change direction to avoid what may be perceived as an object on or in the road.

In 3D computer graphics and computer vision, a depth map is an image or image channel that contains information relating to the distance of the surfaces of scene objects from a viewpoint. Corresponding depth maps of these key points may assist, for example, an autonomous driving system in understanding the environment (e.g., objects) in its immediate path and therefore avoid collisions.

Key point depth mapper 510 calculates a depth of the key points. Key points from SfM map 502 are provided (506) to the key point depth mapper 510. Depth maps may be used to determine common surfaces, common edges and the points that connect them. Key point depth mapper 510 may be implemented by processing logic that can comprise hardware (e.g., circuitry, dedicated logic, programmable logic, microcode, etc.), software (e.g., instructions executing on a processing device), or a combination thereof. It is to be appreciated that not all elements or the order described may be needed to perform the disclosure provided herein, as will be understood by a person of ordinary skill in the art.

As described in FIG. 4A, depth maps are generated using camera poses for each camera image. Camera poses refer to a position and orientation of camera(s) when each image was taken. The key point depth mapper compares those depths against the depths from triangulations resulting from those key points. These depth calculations may be used to identify an object within a pathway of a vehicle (e.g., another vehicle, building, pedestrian, etc.). However, incorrectly triangulated points may potentially compromise these depth calculations and a resulting depth map.

Localization prior 504 is a map created from lidar point clouds that may be restricted to a particular place or location. Lidar uses a pulsed laser to measure distances to, but not limited to, buildings, pedestrians, signs or other objects. It may use ultraviolet, visible, or a near-infrared source to sense objects. Light energy emitted by a lidar system is known as a pulse or transmitted waveform and light reflected from the object is known as return or reflected waveform. Lidar detection schemes of returned waveforms may include "incoherent" or "direct energy" detection, which principally measures amplitude changes of the reflected light. Micropulse systems may utilize intermittent bursts of energy. They use considerably less laser energy, typically on the order of one microjoule, and are often considered "eye-safe." Two main photodetector technologies are used in lidar: solid-state photodetectors, such as avalanche photodiodes, or photomultipliers. However, a sensitivity of the receiver (detector) is another parameter that may need to be balanced in a lidar design." The result is a camera that takes pictures of distance, instead of colors.

Unlike SfM, lidar maps (localization prior) may not suffer from triangulation, incorrect correspondence issues, or parallax issues. Therefore, as described in greater detail hereafter, a localization prior may be used to identify and discard outlier points (incorrectly identified points) in an SfM map and produce a confidence measure over inlier points.

However, because the localization prior may be, in some embodiments, a sparse lidar point cloud (i.e., points not fully connected), there may be holes in generated depth maps. Also, because of sparsity, occluded regions may also be projected onto the depth map through these holes. This will lead to incorrect depth estimation at those locations. For example, structures behind a wall (FIG. 9B) may be included in a lidar point cloud. Therefore, to increase an opacity of the wall's surface, the lidar point cloud is splatted (splat module 508) in the vicinity (neighborhood) of the key points. When splatting, disks (or other shapes) are rendered onto and around the key points to obscure cloud points that may exist behind them. The splat's properties (color and transparency) may vary diametrically from point to point. Flat disks, squares, parallelograms, or other shapes may be generated based on, for example, a property distribution (distribution of shapes). In some embodiments, splatting may include determining a neighborhood around each point of the point cloud, estimating the surface normal at each of the points, computing splats with varying radii and rendering the computed splats.

In some embodiments, the key point depth mapper 510 will register a depth map of the localization prior point cloud without splatting because systematic errors may exist between the underlying optimized poses of the localization prior and the camera poses of the current AV operating. This registration may be needed to compute any deltas in poses arising due to, for example, miscalibration errors in the current operating AV. More specifically, the localization prior point cloud is an optimized point cloud based on lidar data collection from potentially multiple vehicles, whereas the camera poses are from a current vehicle that is moving. So if there is a calibration or other systematic error on the current vehicle (or a systematic error produced from the optimization process that creates the localization prior point cloud), the systematic error may be further exacerbated by using the depth image produced from a splatted version of the localization prior point cloud. Therefore, key point depth mapper 510 registers the depth map produced from an unsplatted localization prior point cloud.

In 512, a depth comparison of a depth of a key point in the SfM map and the same key point within the localization prior determines differences in depths between the two modalities when creating a point cloud map. Potential incorrectly triangulated points (same depth=no) get marked as outliers if their depths do not lie within a predetermined threshold of the depth (e.g., X cm) obtained from the depth map image. In a non-limiting example, X may be 5 (cm). However, one skilled in the art will recognize that other thresholds may be selected without departing from the scope of the technology described herein.

In some embodiments, these outlier key points are removed 514 from the SfM map. In some embodiments, the outlier points may be marked with a low degree of confidence and require additional review.

For the remaining inlier points, the key point depth mapper 510 builds a consensus between depth differences over the key point correspondences used to triangulate that point. This consensus is used to quantify the accuracy of each inlier point by providing a confidence interval for each point. For example, the system is 95% sure that a key point is within X cm of a depth value (e.g., 5 cm). Inlier points would, in some embodiments, be recorded in the map at their current depth. In some embodiments, the high confidence inlier points 518 may be considered at the same depth for common surfaces. For example, across the N camera images, the system may have an inlier key point in each image that corresponds to the same real world point (overlapping regions between camera images). Each key point in each camera image has a depth map value for it. The system may use those depth map values to produce a confidence interval for the depth of that key point correspondence across the images. This confidence interval will then provide an indication of how "stable" the depth map estimate is for the key point correspondence. If the confidence interval is "poor", then that would indicate that something is off with the process as the camera images are not agreeing on the depth for the key point correspondence.

In some embodiments, the SfM map is updated 516 by removing outlier key points 514. Alternately, or in addition to, the outlier points may be marked with a low degree of confidence and require additional review. Alternately, or in addition to, the SfM map is updated 516 by mapping high confidence inlier points 518 to be at the same depth for common surfaces (planes). In some embodiments, the outlier points may be removed from any of the depth maps described herein (splatted, unsplatted, SfM or lidar). Alternately, or in addition to, high confidence points may be mapped to a same depth for a common plane for any of the depth maps described herein (splatted, unsplatted, SfM or lidar).

Figure 6:
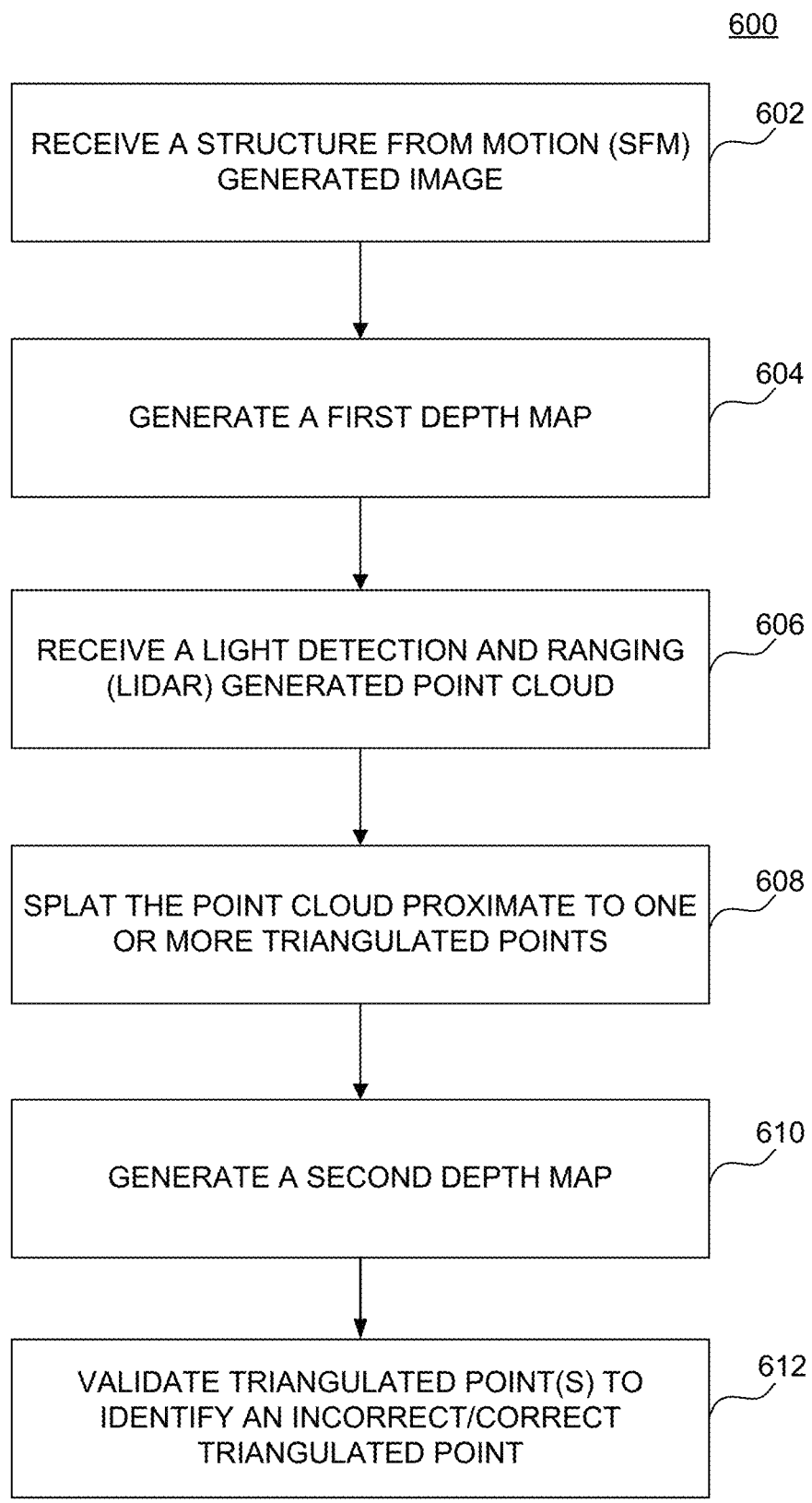
FIG. 6 is a flow diagram of SfM map validation, according to some embodiments.

FIG. 6 is a flowchart for a process for validating an SfM map, according to an embodiment. The SfM map validation process 600 may be performed by an image processing system that includes processing logic that can comprise hardware (e.g., circuitry, dedicated logic, programmable logic, microcode, etc.), software (e.g., instructions executing on a processing device), or a combination thereof. It is to be appreciated that not all steps may be needed to perform the disclosure provided herein. Further, some of the steps may be performed simultaneously, or in a different order than shown in FIG. 6, as will be understood by a person of ordinary skill in the art. The image processing system may include the key point depth mapper 510 or they may be separate system components operating together.

At step 602, an image processing system receives a Structure from Motion (SfM) generated image. An SfM generated image may use a plurality of camera views that may be matched (resolved) by common tie points, such as vertices, edges or surfaces. Multiple images, taken from different cameras or different positions and/or angles, may be matched and modified to correct for various distortions caused by image capture at the different positions. In one non-limiting example, a correction for parallax may be made. Parallax is an apparent displacement of an object because of a change in the observer's point of view. Other example corrections may be needed because of motion errors, miscalibration of the cameras or imaging errors caused by lighting, shading, obfuscation, etc.

At step 604, the image processing system generates a first depth map of various key points located within the SfM map. In 3D computer graphics and computer vision, a depth map is an image that contains information relating to the distance of the surfaces of scene objects from a viewpoint. The image processing system may calculate the depth of each key point within the SfM map. While processing of key points is discussed throughout the descriptions herein, any point located within the SfM map may be processed using the technology as described herein.

At step 606, the image processing system receives a lidar generated point cloud (localization prior) of a same location of the SfM map to include at least some (a portion) common key points. By way of a non-limiting example, an SfM map may be of a field of view at a specific location on a roadway for a vehicle traveling in a known direction. The lidar generated point cloud may be generated at the same or substantially the same location (to include at least some common key points (portion)). In one embodiment, the SfM map and the lidar maps are generated by the same vehicle or, alternatively, by separate vehicles or systems.

At step 608, the image processing system splats the lidar point cloud proximate to one or more key points to increase opacity of an object's surface. When splatting, disks (or other shapes) are rendered onto and around the key points to obscure cloud points that may exist behind them. The splat's properties (color and transparency) may vary diametrically from point to point. Flat disks, squares, parallelograms, or other shapes may be generated based on, for example, a property distribution. In some embodiments, splatting may include determining a neighborhood around each point of the point cloud, estimating the surface normal at each of the points, computing splats with varying radii and rendering the computed splats.

At step 610, the image processing system generates a second depth map from the splatted lidar point cloud proximate to the common one or more key points. Lidar uses a pulsed laser to measure distances to, but not limited to, buildings, pedestrians, signs or other objects. Depth maps may be created for any common points with the SfM map. In a preregistration step, because there may be systematic errors between the localization prior and the splatted version, the image processing system may, in some embodiments, first register a depth map of the localization prior to splatting. This registration may be needed to compute any deltas in poses arising due to, for example, miscalibration errors.

At step 612, the image processing system compares a first depth of a key point (triangulated point) within the SfM depth map with a common key point in the splatted lidar map to validate these key points. A depth comparison of a depth of a key point in the SfM map and the same key point within the localization prior determines differences in depths between the two modalities for creating a point could map. Incorrectly triangulated points (not the same depth) get marked as outliers if their depths do not lie within a set threshold (e.g., X cm) of the depth obtained from the depth map image (e.g., some minor errors may be allowed for points on a common surface). In a non-limiting example, X may be 5 (cm). However, one skilled in the art will recognize that other thresholds may be selected without departing from the scope of the technology described herein.

In some embodiments, these outlier key points are removed from the SfM map. In some embodiments, the outlier points may be marked with a low degree of confidence and require additional review. For the remaining inlier points, the key point depth mapper builds a consensus between depth differences over all the key point correspondences used to triangulate that point. This consensus is used to quantify the accuracy of each inlier point by providing a confidence interval for each point. For example, the system is 95% sure that a key point within X cm of a depth value. Inlier points would, in some embodiments, be recorded in the map at their current depth. In some embodiments, the high confidence inlier points may be considered at the same depth for common surfaces.

Figure 7:
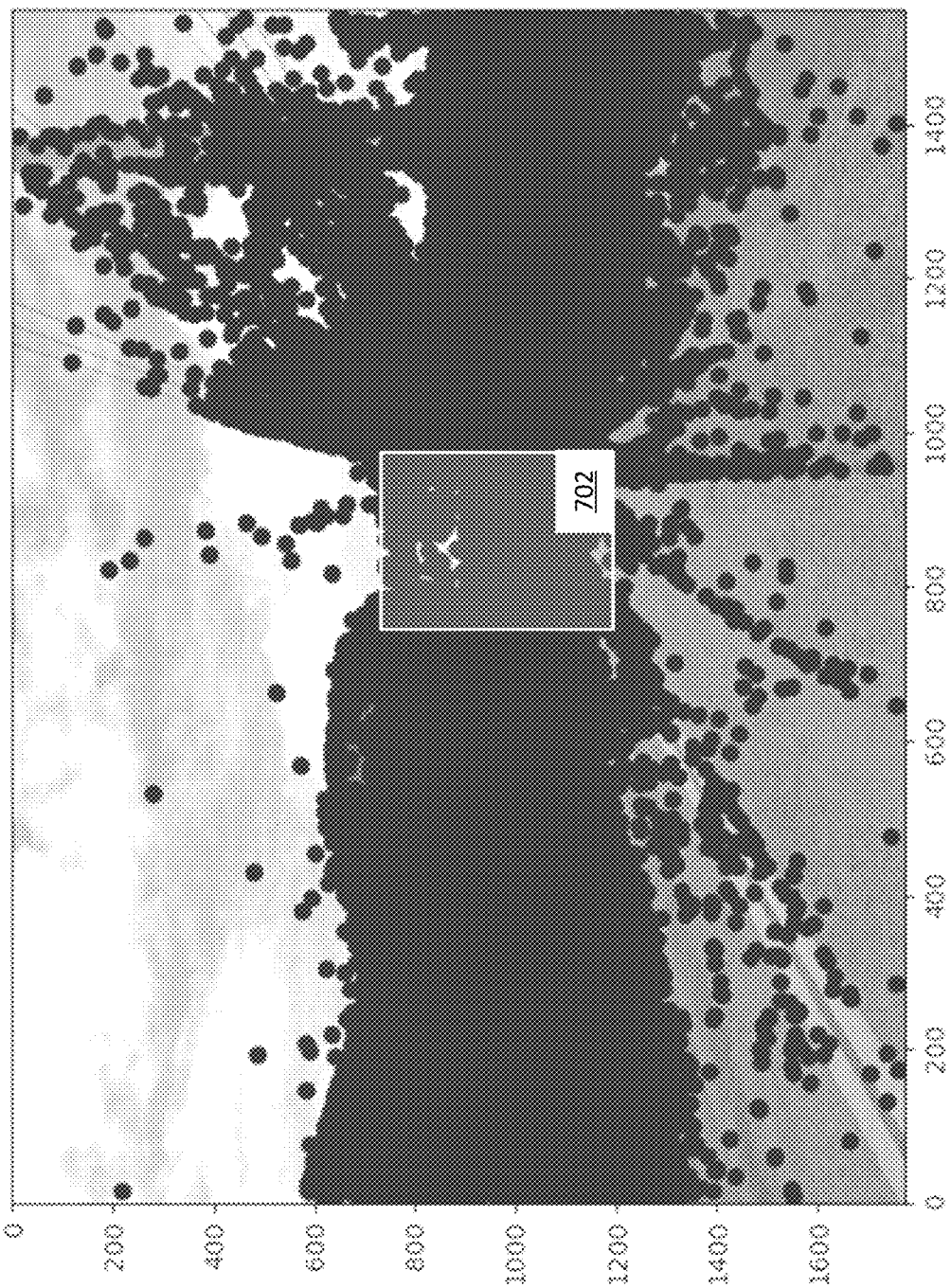
FIG. 7 illustrates an SfM map with potential outlier key points, according to some embodiments.
Figure 8:
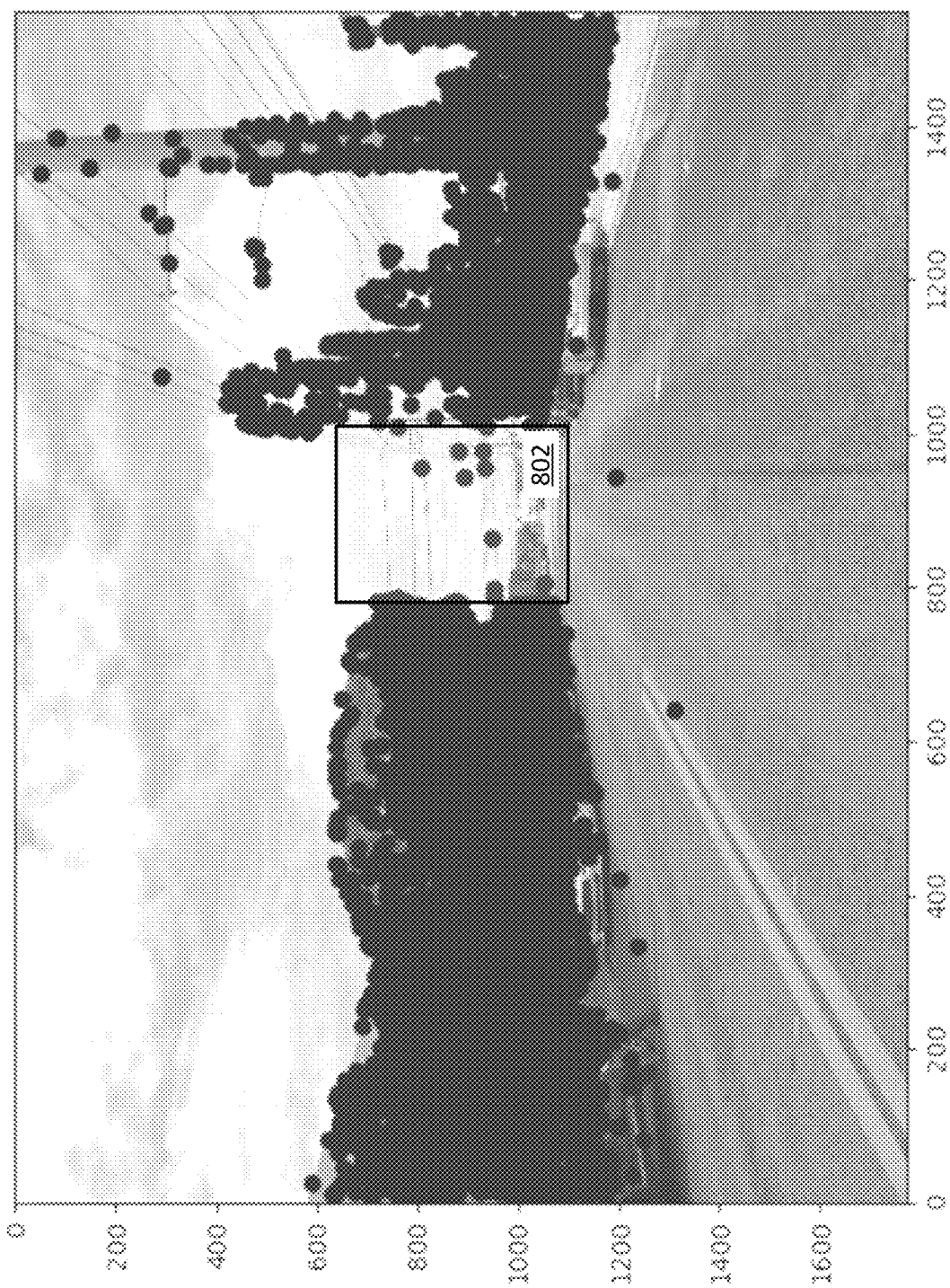
FIG. 8 illustrates an SfM map with outlier key points removed, according to some embodiments.

FIGS. 7 and 8, respectively, illustrate an SfM map before validation and after validation, according to some embodiments. In FIG. 7, an SfM map is illustrated with a plurality of key points of interest. However, also included are many points that may not be correctly identified. In one non-limiting example, many points located within box 702 appear to be part of the road surface or objects above the road surface. In FIG. 8, using the technology described herein, many of these incorrect points have been removed from box 702 (illustrated as box 802) with key points representing objects remaining. For illustration purposes only, the discussion is focused on points located within boxes 702 and 802, however many other incorrect points may have removed during the validation process.

Figure 9C:
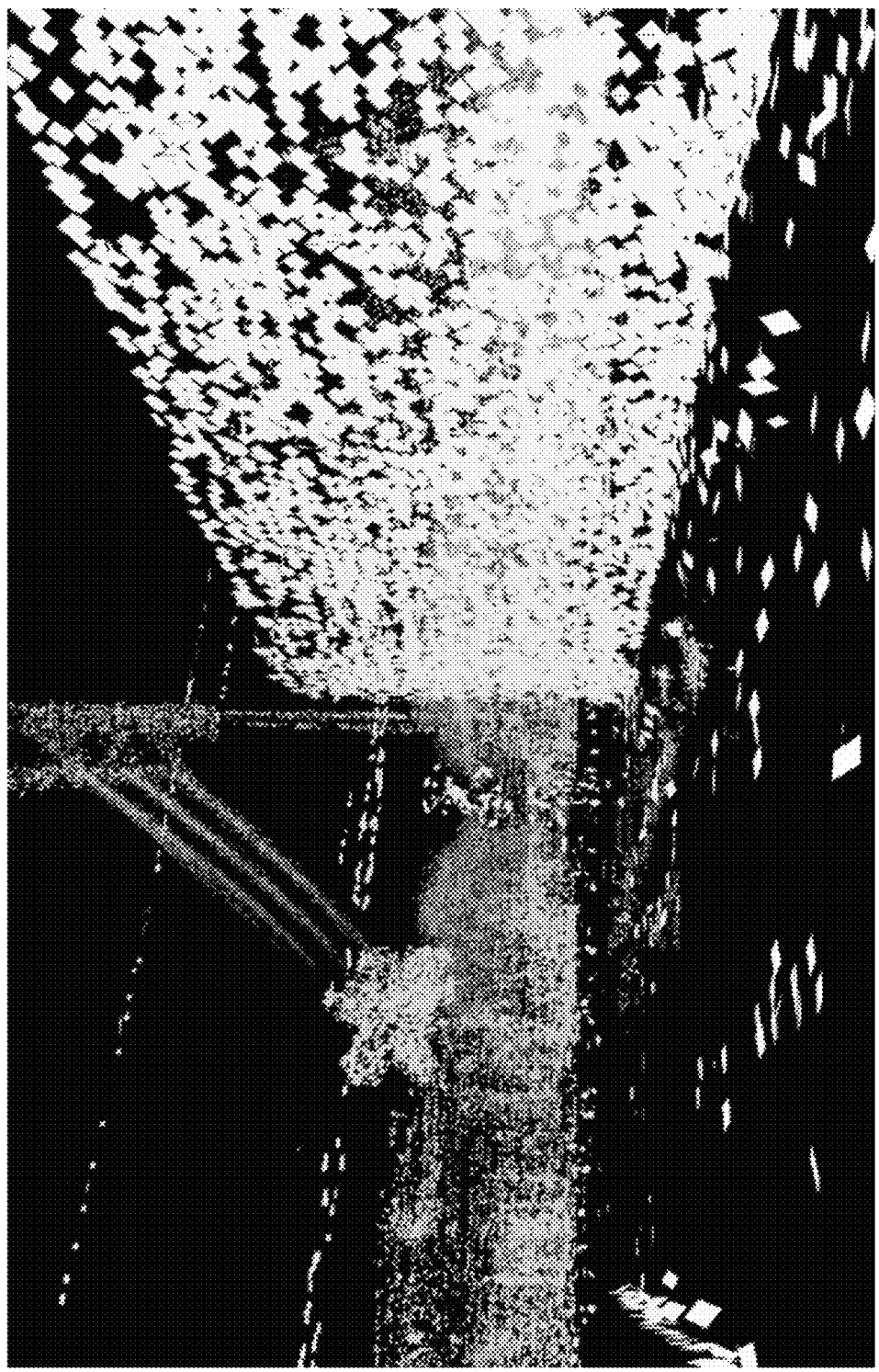
FIG. 9C illustrates a lidar point cloud of the vehicle environment with splatting, according to some embodiments.

FIGS. 9A, 9B and 9C, collectively, illustrate splatting concepts. FIG. 9A illustrates an image (photo) of a location showing a street-level view of various buildings and objects (e.g., vehicles). FIG. 9B illustrates a lidar version of that location per some embodiments. These images may not be the exact same images (slightly different distance or angle), but may be used to demonstrate how splatting may prevent occluded points from being projected into the depth map. As shown, because it is a sparse point cloud (points not fully connected), objects (e.g., buildings as shown) at a depth behind wall 902 on the right may provide unwanted depth points in a depth map of the lidar point cloud. For example, buildings located behind the wall may appear as part of wall surface 902.

FIG. 9C illustrates a splatted version of the lidar point cloud from FIG. 9B. As previously noted, this image may not be an exact copy of image 9B, but is useful for illustrating splatting of a lidar point cloud. As shown, the entire point cloud in the field of view has been splatted to increase the opacity of the object surfaces. However, splatting may be localized to objects of interest or to specific key points. In an exemplary embodiment, splatting the point cloud may be focused on a window (neighborhood) around each key point. A depth map may be generated after splatting of the point cloud. As shown, most of the occluded structure behind the wall 902 is now hidden behind the splats and will therefore reduce pass-through points from occluded structures from being part of the lidar depth map.

The technology described herein has many benefits. For example, the technology described herein provides a computer solution to a problem (inaccurate depth calculations) that occurs in the computer realm and therefore is an improvement to the computer system itself.

Another benefit is removal of outlier key points within an SfM map and establishing a degree of confidence for points not recognized as outliers.

Another benefit is elimination of false detections based on incorrect triangulations or improperly calculated depth maps.

Another benefit is reduction of collisions of autonomous vehicles with objects based on a more accurate representation of the object's key points and associated depths.

Figure 10:
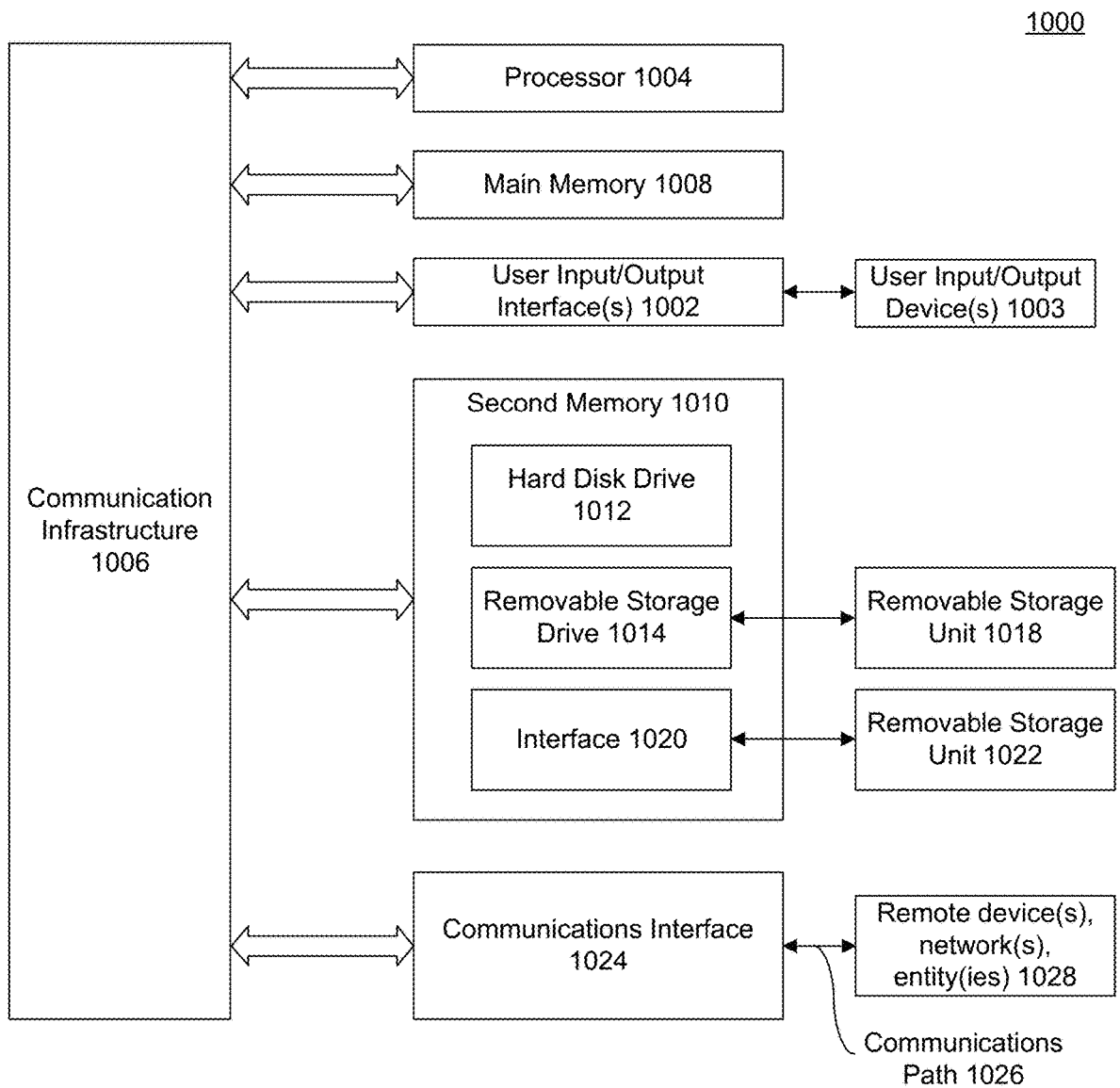
FIG. 10 is an example computer system useful for implementing various embodiments.

Various embodiments can be implemented, for example, using one or more computer systems, such as computer system 1000 shown in FIG. 10. Computer system 1000 can be any computer capable of performing the functions described herein. In a non-limiting example, the computer may be an embedded processing system, a field-programmable gate array (FPGA) Or an application-specific integrated circuit (ASICs).

Computer system 1000 can be any well-known computer capable of performing the functions described herein. Computer system 1000 includes one or more processors (also called central processing units, or CPUs), such as a processor 1004. Processor 1004 is connected to a communication infrastructure or bus 1006.

One or more processors 1004 may each be a graphics processing unit (GPU). In an embodiment, a GPU is a processor that is a specialized electronic circuit designed to process mathematically intensive applications. The GPU may have a parallel structure that is efficient for parallel processing of large blocks of data, such as mathematically intensive data common to computer graphics applications, images, videos, etc.

Computer system 1000 also includes user input/output device(s) 1003, such as monitors, keyboards, pointing devices, etc., that communicate with communication infrastructure 1006 through user input/output interface(s) 1002.

Computer system 1000 also includes a main or primary memory 1008, such as random access memory (RAM). Main memory 1008 may include one or more levels of cache. Main memory 1008 has stored therein control logic (i.e., computer software) and/or data.

Computer system 1000 may also include one or more secondary storage devices or memory 1010. Secondary memory 1010 may include, for example, a hard disk drive 1010 and/or a removable storage device or drive 1014. Removable storage drive 1014 may be a floppy disk drive, a magnetic tape drive, a compact disk drive, an optical storage device, tape backup device, and/or any other storage device/drive.

Removable storage drive 1014 may interact with a removable storage unit 1018. Removable storage unit 1018 includes a computer usable or readable storage device having stored thereon computer software (control logic) and/or data. Removable storage unit 1018 may be a floppy disk, magnetic tape, compact disk, DVD, optical storage disk, and/any other computer data storage device. Removable storage drive 1014 reads from and/or writes to removable storage unit 1018 in a well-known manner.

According to an exemplary embodiment, secondary memory 1010 may include other means, instrumentalities or other approaches for allowing computer programs and/or other instructions and/or data to be accessed by computer system 1000. Such means, instrumentalities or other approaches may include, for example, a removable storage unit 1022 and an interface 1020. Examples of the removable storage unit 1022 and the interface 1020 may include a program cartridge and cartridge interface (such as that found in video game devices), a removable memory chip (such as an EPROM or PROM) and associated socket, a memory stick and USB port, a memory card and associated memory card slot, and/or any other removable storage unit and associated interface.

Computer system 1000 may further include a communication or network interface 1024. Communication interface 1024 enables computer system 1000 to communicate and interact with any combination of remote devices, remote networks, remote entities, etc. (individually and collectively referenced by reference number 1028). For example, communication interface 1024 may allow computer system 1000 to communicate with remote devices 1028 over communications path 1026, which may be wired and/or wireless, and which may include any combination of LANs, WANs, the Internet, etc. Control logic and/or data may be transmitted to and from computer system 1000 via communication path 1026.

In an embodiment, a tangible, non-transitory apparatus or article of manufacture comprising a tangible, non-transitory computer useable or readable medium having control logic (software) stored thereon is also referred to herein as a computer program product or program storage device. This includes, but is not limited to, computer system 1000, main memory 1008, secondary memory 1010, and removable storage units 1018 and 1022, as well as tangible articles of manufacture embodying any combination of the foregoing. Such control logic, when executed by one or more data processing devices (such as computer system 1000), causes such data processing devices to operate as described herein.

Based on the teachings contained in this disclosure, it will be apparent to persons skilled in the relevant art(s) how to make and use embodiments of this disclosure using data processing devices, computer systems and/or computer architectures other than that shown in FIG. 10. In particular, embodiments can operate with software, hardware, and/or operating system implementations other than those described herein.

It is to be appreciated that the Detailed Description section, and not any other section, is intended to be used to interpret the claims. Other sections can set forth one or more but not all exemplary embodiments as contemplated by the inventor(s), and thus, are not intended to limit this disclosure or the appended claims in any way.

It is to be appreciated that the Detailed Description section, and not any other section, is intended to be used to interpret the claims. Other sections can set forth one or more but not all exemplary embodiments as contemplated by the inventor(s), and thus, are not intended to limit this disclosure or the appended claims in any way.

While this disclosure describes exemplary embodiments for exemplary fields and applications, it should be understood that the disclosure is not limited thereto. Other embodiments and modifications thereto are possible, and are within the scope and spirit of this disclosure. For example, and without limiting the generality of this paragraph, embodiments are not limited to the software, hardware, firmware, and/or entities illustrated in the figures and/or described herein. Further, embodiments (whether or not explicitly described herein) have significant utility to fields and applications beyond the examples described herein.

Embodiments have been described herein with the aid of functional building blocks illustrating the implementation of specified functions and relationships thereof. The boundaries of these functional building blocks have been arbitrarily defined herein for the convenience of the description. Alternate boundaries can be defined as long as the specified functions and relationships (or equivalents thereof) are appropriately performed. Also, alternative embodiments can perform functional blocks, steps, operations, methods, etc. using orderings different than those described herein.

References herein to "one embodiment," "an embodiment," "an example embodiment," or similar phrases, indicate that the embodiment described can include a particular feature, structure, or characteristic, but every embodiment can not necessarily include the particular feature, structure, or characteristic. Moreover, such phrases are not necessarily referring to the same embodiment. Further, when a particular feature, structure, or characteristic is described in connection with an embodiment, it would be within the knowledge of persons skilled in the relevant art(s) to incorporate such feature, structure, or characteristic into other embodiments whether or not explicitly mentioned or described herein. Additionally, some embodiments can be described using the expression "coupled" and "connected" along with their derivatives. These terms are not necessarily intended as synonyms for each other. For example, some embodiments can be described using the terms "connected" and/or "coupled" to indicate that two or more elements are in direct physical or electrical contact with each other. The term "coupled," however, can also mean that two or more elements are not in direct contact with each other, but yet still co-operate or interact with each other.

The breadth and scope of this disclosure should not be limited by any of the above-described exemplary embodiments, but should be defined only in accordance with the following claims and their equivalents.

What is claimed is:

1. A method of validating triangulated points in a digital image, the method comprising,
receiving a motion-generated image corresponding to the digital image;
generating a first depth map, wherein the first depth map comprises first depth information for one or more triangulated points located within the motion-generated image;
receiving a light detection and ranging (lidar) generated point cloud comprising a portion of the one or more triangulated points;
splatting the lidar generated point cloud proximate to the portion of the one or more triangulated points to generate a splatted point cloud;
generating a second depth map for at least the portion of the one or more triangulated points, wherein the second depth map comprises second depth information for the portion of the one or more triangulated points located within the splatted point cloud; and
validating a triangulated point, of the portion of one or more triangulated points, based on comparing the first depth information to the second depth information.

2. The method of claim 1, wherein the motion-generated image comprises a three-dimensional map generated by Structure from Motion (SfM) imaging.

3. The method of claim 2, wherein the SfM imaging is generated from a plurality of images comprising one or more common key points.

4. The method of claim 1, wherein validating the triangulated point further comprises identifying an incorrect triangulated point and removing the incorrect triangulated point from the first depth map.

5. The method of claim 4, further comprising removing the incorrect triangulated point from the motion-generated image.

6. The method of claim 4, wherein the identifying the incorrect triangulated point further comprises determining whether the second depth information does not favorably compare, within a predetermined threshold, to the first depth information.

7. The method of claim 1, wherein validating the triangulated point further comprises determining one or more correct triangulated points, when the second depth information compares favorably, within a predetermined threshold, to the first depth information.

8. The method of claim 7, wherein the determining one or more correct triangulated points further comprises calculating consensus depth information for a plurality of the one or more triangulated points.

9. The method of claim 7, further comprising determining a confidence for the one or more correct triangulated points.

10. The method of claim 1, wherein the generating the first depth map further comprises comparing multiple camera poses for a plurality of camera images.

11. The method of claim 1, wherein the generating the first depth map further comprises comparing depths from the first depth map of triangulated points against depths from triangulating these points.

12. The method of claim 1, wherein the splatting comprises rendering opaque surfaces from points within the lidar generated point cloud without connectivity.

13. The method of claim 1, wherein the splatting comprises determining a neighborhood around key points of the lidar generated point cloud, estimating a surface normal at each of the key points, computing splats with varying radii and rendering the computed splats.

14. A system, comprising:
a memory; and
at least once processor coupled to the memory and configured to:
receive a motion-generated image corresponding to a digital image;
generate a first depth map, wherein the first depth map comprises first depth information for one or more triangulated points located within the motion-generated image;
receive a light detection and ranging (lidar) generated point cloud comprising a portion of the one or more triangulated points;

splat the lidar generated point cloud proximate to the portion of the one or more triangulated points to generate a splatted point cloud;

generate a second depth map for at least the portion of the one or store triangulated points, wherein the second depth map comprises second depth information for the portion of the one or more triangulated points located within the splatted point cloud; and validate a triangulated point, of the portion of one or more triangulated points, based on comparing the first depth information to the second depth information.

15. The system of claim 14, wherein the at least one processor is further configured to identify the validated triangulated point as an incorrect triangulated point when the second depth information does not favorably compare, within a predetermined threshold, to the first depth information.

16. The system of claim 14, wherein the at least one processor is further configured to identify the validated triangulated point as a correct triangulated point when the second depth information favorably compares, within a predetermined threshold, to the first depth information.

17. The system of claim 15, wherein the at least one processor is further configured to determine consensus depth information for one or more of the correct triangulated points.

18. The system of claim 14, wherein the at least one processor is further configured to determine a confidence for the correct triangulated point.

19. The system of claim 14, wherein the wherein the splat comprises:
rendering opaque surfaces from points within the lidar generated point cloud without connectivity.

20. A method of correcting a structure for motion (SfM) map comprising:

receiving a structure for motion-generated map;

generating a first depth map, wherein the first depth map comprises first depth information for one or more triangulated points located within the structure for motion-generated map;

receiving a light detection and ranging (lidar) generated point cloud comprising a portion of the one or more triangulated points;

splatting the lidar generated point cloud proximate to the portion of the one or more triangulated points to generate a splatted point cloud;

generating a second depth map for at least the portion of the one or more triangulated points, wherein the second depth map comprises second depth information for the portion of the one or more triangulated points located within the splatted point cloud;

identifying an incorrect triangulated point, of the portion of one or more triangulated points, based on comparing the first depth information to the second depth information;

and removing the incorrect triangulated point from the structure for motion-generated map.

* * * * *